United States Patent

[11] 3,596,775

| [72] | Inventor | Edward E. Ingraham<br>22 Green Hill Lane, R.F.D. 5, Huntington,<br>N.Y. 11743 |
|---|---|---|
| [21] | Appl. No. | 832,063 |
| [22] | Filed | June 11, 1969 |
| [45] | Patented | Aug. 3, 1971 |

[54] AIRCRAFT LIFTING SYSTEM AND APPARATUS
8 Claims, 1 Drawing Fig.

[52] U.S. Cl. ..................................................... 214/1 R,
214/1 BS
[51] Int. Cl. ........................................................ B66c 23/18
[50] Field of Search............................................ 214/1 D, 1,
1 BS– 1 BS4, 38.42; 294/65; 212/41

[56] References Cited
UNITED STATES PATENTS
2,492,172  12/1949  Morris............................ 214/1 D
2,498,819  2/1950  Noville.......................... 214/38 (42) X
3,160,288  12/1964  Kelly.............................. 214/1
3,211,425  10/1965  Greulich et al. ............... 214/1 X
FOREIGN PATENTS
1,028,065  5/1966  Great Britain................. 294/65

Primary Examiner—Gerald M. Forlenza
Assistant Examiner—Frank E. Werner
Attorney—Curtis, Morris & Safford ABSTRACT: A system is disclosed for lifting and moving aircraft. One or more vacuum support units are attached to top surfaces of airplane wings in such a manner as to distribute lifting forces to the wing frame structure in a manner corresponding to the supporting forces exerted to the wings when the airplane is in flight. The aircraft is thereby lifted in an efficient and dependable manner without imposing objectionable stresses upon any of the components or parts. The invention is particularly adapted to retrieving and/or moving aircraft which is damaged or is disabled so that it cannot move itself.

PATENTED AUG 3 1971          3,596,775
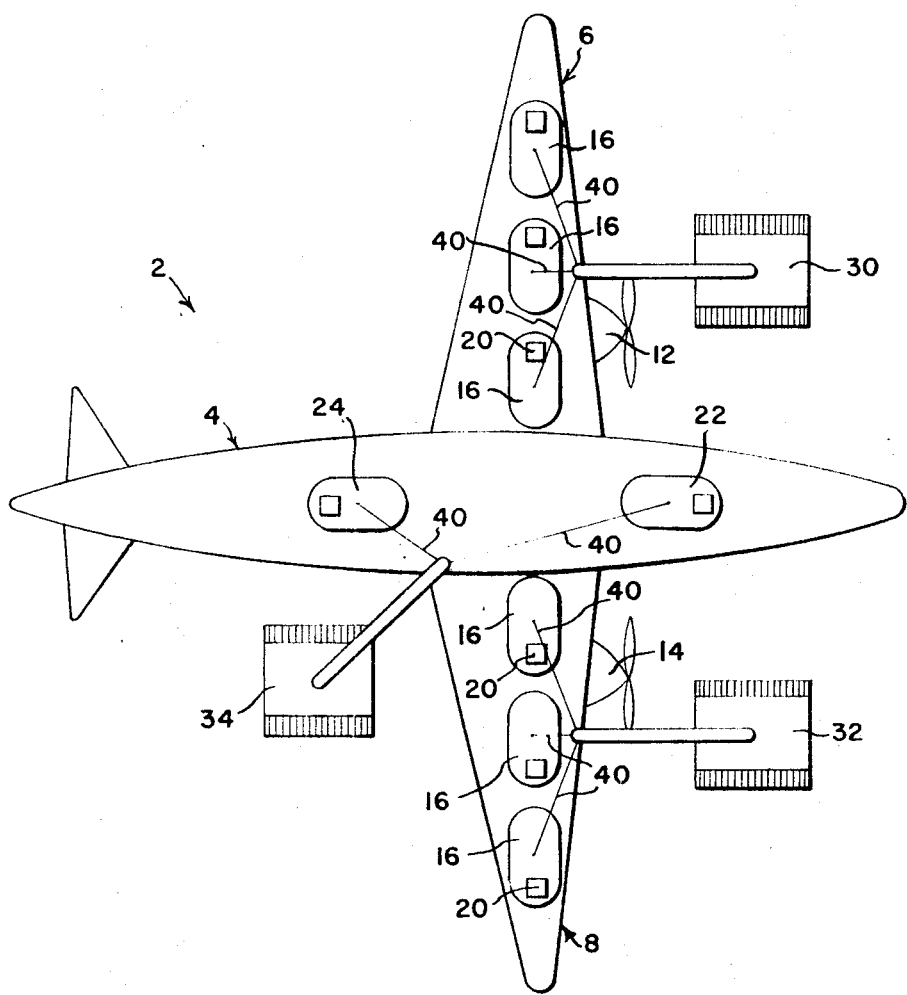
INVENTOR.
Edward E. Ingraham
BY
Curtis, Morris & Safford
ATTORNEYS

AIRCRAFT LIFTING SYSTEM AND APPARATUS

This invention relates to systems and methods for lifting and moving aircraft, and more in particular to the retrieval of aircraft which is disabled or so situated so that it cannot be moved readily with its own means of support.

An object of this invention is to provide improved systems, means and methods for moving disabled or incapacitated aircraft. A further object is to provide efficient and dependable means for lifting aircraft in such a manner as to avoid damage to components and parts thereof. Another object is to provide efficient and dependable supporting means for aircraft which permits the retrieval or moving of aircraft without damage thereto.

Generally, an airplane has a frame structure which is covered by a sheet metal skin. The frame structure is a core extending the length of the fuselage and outwardly within the wings, and it is necessary to maintain minimum size and weight and permit freedom of design and the necessary safety factors. Hence, each component of the frame structure is designed and engineered to perform its functions when the aircraft is airborne as well as during landing, taxiing, and loading and unloading. Errors in operation and malfunctioning of the mechanisms as well as unforeseen circumstances cause aircraft to become disabled. For example, the landing gear may not be moved into proper position prior to landing or some circumstance may damage the landing gear. When that occurs on the runway of a busy airport great difficulty may e encountered. That is, the runway must be cleared to permit incoming planes to land and great danger may be encountered if the disabled aircraft is not removed from the runway promptly. Hence, there have been instances where an airplane with a minor disability has been severely damaged by the simple procedure of removing it from the runway. Also, even when an aircraft is severely damaged it is desirable to move it to a place where it can be repaired or rebuilt without causing additional damage. In the past, no thoroughly practical system or arrangement has been available to handle disabled aircraft. Accordingly, it is an object of the present invention to overcome the difficulties which have been encountered in the past in lifting, moving, supporting and retrieving aircraft.

These and other objects will be in part obvious and in part pointed out below.

In the drawing:

The single FIGURE is a schematic view of an airplane being lifted in accordance with the present invention.

Referring to FIG. 1 of the drawings, an airplane 2 has a fuselage 4, a pair of wings 6 and 8, a landing gear 10 and two engines 12 and 14 mounted upon the wings. Airplane 2 has an internal frame which is of standard design and is constructed of metal frame members. The wings, fuselage and engines are enclosed by sheet metal which is attached to the frame structure by rows of rivets in a well-known manner. Airplane 2 is illustrative of various types of aircraft and does not otherwise have significance in connection with the present invention.

Positioned upon the top surface of each of the wings 6 and 8 is a group of three vacuum lifter units 16, each of which is formed by a rigid plate structure having a bottom face parallel to and spaced slightly from an area of the top surface of the wing. A flexible seal strip is attached to the periphery of the rigid plate structure and provides an airtight seal between the coextensive surfaces of the vacuum lifter unit and the wing. There is also a vacuum pump 20 driven by an electric motor mounted on the top of the plate structure and connected and operative to produce and maintain a relatively high vacuum within the space between the vacuum lifter unit and the wing. Controls are provided to start and stop the pump to produce and maintain the desired vacuum condition. Hence, each of the vacuum lift units is secured to the wing by its vacuum condition. Also, each of the vacuum lifter units is so positioned upon the wing as to provide a satisfactory lifting action upon the wing. The lifting forces are transmitted to the frame structure of the wing and thence to the fuselage. Units 16 are so positioned and are of such size and configuration that they produce lifting forces which are generally the same as the lifting forces upon the wing when the airplane is airborne. Hence, when the airplane is lifted by lifter units 16 upwardly the frame structure is subjected to substantially the same force conditions as those for which the frame structure is engineered and designed. It will be understood that circumstances may make it desirable to exert lifting forces upon the fuselage, and for that purpose two vacuum lifter units 22 and 24 are positioned upon the top surface of the fuselage fore and aft.

In this embodiment, airplane 2 is lifted by three mobile cranes 30, 32 and 34, each crane lifting the group of the vacuum lifter units respectively on wings 6 and 8 and fuselage 4. Cables 40 connect the vacuum lifter units to their respective cranes.

When airplane 2 is to be lifted, the operator for each of the cranes takes up the slack in the cables 40 and the lengths of the cables are adjusted so as to provide the desired simultaneous lifting of each of the units in the group. The cranes are then operated to produce simultaneous lifting so that the airplane is lifted in a manner very similar to the manner in which it is supported and airborne. The cranes are of the crawler type so that when the airplane is lifted free of the ground it can be transported to a new location. Alternatively, a supporting carriage can be positioned under it and it can then be lowered to the supporting carriage.

The invention contemplates automatic means for producing, maintaining and releasing the vacuum, then holding each of the vacuum lifter units to the airplane. Hence, the lifter units may be readily detached and carried away by the cranes. It has been indicated above that the lifter units are positioned in a manner such that they will transmit lifting forces to the aircraft frame. It is believed that under most circumstances it will not be necessary to provide lifter units on the fuselage. Also, two cranes can be provided for each wing, one forward and the other rearward, and they can be held together by cables.

It has been indicated above that each of the three groups of lifter units on the wings and fuselage is lifted by a single crane. The cranes may be of the crawler type, and it is important that all of the lifter units provide the desired lifting forces at all times. In this embodiment, the cables 40 for each of the cranes is a single cable having its ends attached to the crane and with a loop extending to each of the lifter units. The loops are interconnected at the crane through two pulleys, and each of the loops extends through a pulley mounted upon its lifter unit. Hence, as the crane is lifted to pull the cable taut it passes freely through the pulleys so that all of the strands extending between the crane and a lifter unit are pulled taut simultaneously. In that condition the cable is automatically clamped at the pulley so that the further lifting action of the crane is transmitted to each of the lifter units through the two strands of the cable. The showing of the drawing is somewhat schematic and the details of construction are omitted with respect to the lifter units, the cranes, the pulleys, etc., as they may be of known types. As used in the claims, the term "top surfaces" refers to the upper surfaces and are normally the top surfaces when the aircraft is in flight. However, it is understood that the invention is applicable to lift disabled aircraft in inverted condition and in any position which the aircraft assumes when disabled.

What I claim is:

1. In the art of lifting aircraft, the steps of, exerting vacuum-lifting forces upon top surfaces of the aircraft, and distributing and controlling said lifting forces to provide a lifting pattern which is substantially similar to the design-lifting condition when the aircraft is in flight and which does not produce excessive stress conditions upon the aircraft.

2. The method as described in claim 1, wherein the aircraft has a fuselage and a pair of wings presenting top surfaces, and wherein the vacuum-lifting forces are exerted upon said top surfaces by individual vacuum lifter units positioned thereon.

3. The method as described in claim 2, wherein lifting is performed by first attaching the lifter units to said top surfaces and then exerting lifting forces on said lifter units.

4. The method as described in claim 3, wherein there is a plurality of said lifter units upon each of the wings of the aircraft and there is a single lifting crane for the lifter units on each wing.

5. In combination with an aircraft, a plurality of vacuum lifter units positioned upon the top surfaces of said aircraft and so positioned as to provide vacuum attachment to the aircraft, means to exert lifting forces on said vacuum lifter units, and means to control said lifting forces to transmit an overall lifting pattern which is substantially similar to the lifting pattern for the aircraft in flight.

6. Apparatus as described in claim 5, wherein the aircraft has a pair of wings and there is a plurality of said lifter units mounted upon each of said wings, and wherein said means to exert lifting forces comprises a plurality of crane means with there being one crane means for the lifter units upon each of said wings.

7. Apparatus as described in claim 6 which includes a vacuum lifter unit mounted on the top surface of said fuselage, and crane means therefor.

8. In a system for exerting lifting forces upon aircraft components of an aircraft having top outer surfaces and a frame structure to which are transmitted a general pattern of forces from said outer surfaces which forces support the aircraft in flight, a plurality of lifter units positioned upon said top outer surfaces and exerting distributed vacuum-lifting forces to said top outer surfaces with said lifting forces being thereby transmitted to said frame structure, lifting means to exert coordinated lifting forces on said lifting units, and control means for said vacuum-lifting forces and said coordinated lifting forces to produce distributed lifting forces to said top outer surfaces and said frame structure of said general pattern of forces and which at no point the forces exceeds the forces which are present when the aircraft is in flight.